(12) United States Patent
Cheong et al.

(10) Patent No.: US 7,039,039 B2
(45) Date of Patent: May 2, 2006

(54) QOS SUPPORT METHOD IN A HIGH-RATE PACKET DATA SYSTEM

(75) Inventors: Dong-Jo Cheong, Suwon-si (KR); Yong Chang, Seongnam-si (KR); Jun-Hyuk Song, Anyang-si (KR); Nae-Hyun Lim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 10/888,971

(22) Filed: Jul. 13, 2004

(65) Prior Publication Data
US 2005/0094611 A1 May 5, 2005

(30) Foreign Application Priority Data
Oct. 30, 2003 (KR) .................... 10-2003-0076386

(51) Int. Cl.
*H04L 12/66* (2006.01)

(52) U.S. Cl. ................. 370/349; 370/353; 370/354

(58) Field of Classification Search ............... 370/230, 370/231, 235, 236, 252, 349, 352–356, 346, 370/395.21
See application file for complete search history.

(56) References Cited

U.S. PATENT DOCUMENTS

| | | | |
|---|---|---|---|
| 6,031,832 A * | 2/2000 | Turina ........................ 370/348 |
| 6,519,254 B1 * | 2/2003 | Chuah et al. .............. 370/389 |
| 6,708,034 B1 * | 3/2004 | Sen et al. .................... 455/445 |
| 6,728,365 B1 * | 4/2004 | Li et al. ...................... 379/329 |
| 6,798,757 B1 * | 9/2004 | Mizutani et al. ............ 370/329 |
| 2002/0015395 A1 * | 2/2002 | Karagiannis ................ 370/338 |
| 2002/0034166 A1 * | 3/2002 | Barany et al. .............. 370/329 |
| 2002/0122432 A1 * | 9/2002 | Chaskar ..................... 370/466 |
| 2003/0137960 A1 * | 7/2003 | Greis ......................... 370/338 |
| 2004/0008689 A1 * | 1/2004 | Westphal et al. ....... 370/395.21 |

\* cited by examiner

*Primary Examiner*—Chau Nguyen
*Assistant Examiner*—Soon D. Hyun
(74) *Attorney, Agent, or Firm*—Roylance, Abrams, Berdo & Goodman, L.L.P.

(57) ABSTRACT

Disclosed is a Quality-of-Service (QoS) Support method in a mobile communication system including an access terminal, an access network for performing packet data communication with the access terminal, a packet control function for controlling transmission and reception of packet data between the access network and the access terminal, and a packet data service node for exchanging packet data with the packet control function. The access terminal maps a requirement based on an application characteristic to an IP QoS parameter, generates a resource reservation protocol message, and transmits the resource reservation protocol message to the packet data service node. The packet data service node maps IP QoS information to be transmitted to the access terminal to QoS information needed in the access network, and transmits the mapping result to the access network via the packet control function. The access terminal receives data including QoS information from the packet data service node, and performs communication according to the QoS information.

12 Claims, 4 Drawing Sheets

QOS SUPPORT METHOD IN A HIGH-RATE PACKET DATA SYSTEM

PRIORITY

This application claims the benefit under 35 U.S.C. § 119(a) to an application entitled "QoS Support Method in a High-Rate Packet Data System" filed in the Korean Intellectual Property Office on Oct. 30, 2003 and assigned Serial No. 2003-76386, the entire contents of which are incorporated herein by reference.

BACKGROUND OF THE INVENTION

1. Field of the Invention

The present invention relates generally to a Quality-of-Service (QoS) support method in a high-rate packet data system. In particular, the present invention relates to a method for providing QoS information to an access network.

2. Description of the Related Art

A Code Division Multiple Access 2000 (CDMA2000) system has been developed from an Interim Standard-95 (IS-95) system for chiefly supporting transmission and reception of voice signals into IS-2000 and IS-856 systems capable of transmitting and receiving high-rate data as well as voice signals. In particular, CDMA2000 1× and 1×EV-DO systems provide a function of transferring data on a packet-by-packet basis.

A communication scheme such as an existing telephone service secures a path through a previous signaling procedure with the desired party. The secured path cannot be used by other users. By transferring data through the designated path, it is possible to prevent a possible delay in a transmission section.

In the Internet Protocol (IP)-based packet communication architecture, data is transmitted with a header attached to the head thereof, instead of being transmitted after a path is previously set up, and routers forward the data to its destination based on the header information. Furthermore, in the IP-based packet communication architecture, when there is a large volume of traffic, data is transmitted in arrival order. Such a scheme for transmitting data in arrival order regardless of its traffic type is called a "Best Effort."

The current scheme for transferring a packet via a CDMA2000 packet network is achieved by the Best Effort scheme. Such a data transfer scheme cannot guarantee transmission of real-time data for packet-based Video Telephone Service and packet-based Packet Voice Service (known as VoIP Service), for example, which will be introduced in the future. In addition, even such a data service which is insusceptible to a transmission delay is provided in different Quality of Service levels (QoSs) according to conditions of a network, thus causing users dissatisfaction. That is, the packet-based data transmission architecture disadvantageously cannot guarantee QoS in transmission of real-time data.

A QoS Support scheme for packet transmission has been introduced as a scheme for resolving such a problem.

The QoS Support scheme can be classified into an IP QoS Support scheme defined in a network layer in a CDMA2000 network, and a QoS scheme in an access network corresponding to a lower layer for supporting the IP QoS Support scheme. The IP QoS scheme has been mostly standardized by the Internet Engineering Task Force (IETF), an international standardization organization, and includes an Integrated-Service (Int-Serv) scheme and a Differentiated-Service (Diff-Serv) scheme as typical schemes.

In the Int-Serv scheme, each node desiring to transmit data sets up the necessary resources through a previous reservation procedure before transmitting data, and a Resource reSerVation Protocol (RSVP) is used as a signaling protocol for resource reservation.

In the Diff-Serve scheme, each node desiring to transmit data designates relative priority for a packet in a data header before transmission, thereby differentially processing a packet based on priority information acquired through the header.

Such an IP QoS Support method is available in an IP node. In a CDMA2000 network, the IP QoS Support method can be applied to access terminals (ATs), a packet data service node (PDSN), and several routers constituting an IP core network.

A CDMA2000 Access Network QoS scheme provides a QoS function between an access network and an access terminal, and can provide the QoS function through QoS parameters defined in an access network and a control algorithm. Therefore, in order to support an End-to-End QoS scheme, interworking between a standardized IP QoS scheme and a QoS scheme in an access network is needed. In the current $3^{rd}$ Generation Partnership Project 2 (3GPP2), for End-to-End QoS Service, QoS of an access network is set between an access terminal and a packet data service node (PDSN) by transferring QoS information through RSVP, and a packet data network after the PDSN considers supporting Relative QoS by Diff-Serv.

FIG. 1 is a diagram illustrating an architecture for supporting End-to-End QoS via a CDMA2000 packet network whose standardization is currently in progress. Referring to FIG. 1, an upper application layer can acquire required QoS information by exchanging information for session setup (106), and can support IP QoS Service (107) capable of performing relative packet processing by actually reserving required resources through End-to-End QoS information transmission in an IP layer or setting a DiffServ Code Point (DSCP) value in an IP header. Such a QoS Support scheme in an IP layer must interwork with a QoS setup method (108) in an access network (AN) 102 that supports actual Bearer Service. That is, IP QoS Service (107) is a scheme that can be used between nodes performing IP communication, and a CDMA2000 packet network corresponds to an access terminal (AT) 101, a PDSN 103, and routers constituting an IP core network. The access network (AN) 102 constituting a CDMA2000 access network is not an IP node, and it supports QoS by a QoS scheme defined in a separate access network 102. Therefore, an algorithm for interworking between IP QoS and CDMA2000 Access Network QoS is required, and QoS parameters for the algorithm must be defined.

In the current CDMA2000 1× system, it is possible for an access terminal to transfer a QoS BLock-of-Bits (BLOB) representative of QoS information to a network. However, the CDMA2000 1×EV-DO system does not support a method in which an access terminal transfers a QoS BLOB representative of QoS information to a network.

In the CDMA2000 1× system, because multiple services can be distinguished using service option information, separate QoSs can be managed for separate services. However, currently, the CDMA2000 1×EV-DO system does not provide a scheme for distinguishing multiple services. Therefore, a scheme for performing separate QoSs for separate services and a scheme for distinguishing multiple services are required.

SUMMARY OF THE INVENTION

It is, therefore, an object of the present invention to provide a method for enabling a QoS function by setting up traffic so that it corresponds to a service characteristic provided in a mobile communication system.

It is another object of the present invention to provide a mapping method for interworking between an IP QoS scheme and an Access Network QoS scheme.

To achieve the above and other objects, there is provided a Quality-of-Service (QoS) Support method in a mobile communication system including an access terminal, an access network for performing packet data communication with the access terminal, a packet control function for controlling transmission and reception of packet data between the access network and the access terminal, and a packet data service node for exchanging packet data with the packet control function. In the method, the access terminal maps a requirement based on an application characteristic to an Internet Protocol (IP) QoS parameter, generates a resource reservation protocol (RSVP) message, and transmits the resource reservation protocol message to the packet data service node. The packet data service node maps IP QoS information to be transmitted to the access terminal to QoS information needed in the access network, and transmits the mapping result to the access network via the packet control function. The access terminal receives data including QoS information from the packet data service node, and performs communication according to the QoS information.

BRIEF DESCRIPTION OF THE DRAWINGS

The above and other objects, features and advantages of the present invention will become more apparent from the following detailed description when taken in conjunction with the accompanying drawings in which.

Throughout the drawings, like numbers are used to refer to like features and structures.

DETAILED DESCRIPTION OF THE EXEMPLARY EMBODIMENT

A preferred embodiment of the present invention will now be described in detail with reference to the annexed drawings. In the following description, a detailed description of known functions and configurations incorporated herein has been omitted for conciseness.

The present invention provides a method for transferring QoS mapping information to a network through an RSVP message according to an application characteristic in a high-rate packet data system, mapping the QoS mapping information to an Access Network QoS parameter in a packet data service node, and transferring the mapping result to a lower layer.

When there are multiple services, QoSs are separately applied to the services by transferring information for distinguishing the services from a packet data service node to an access network.

Figure 1:
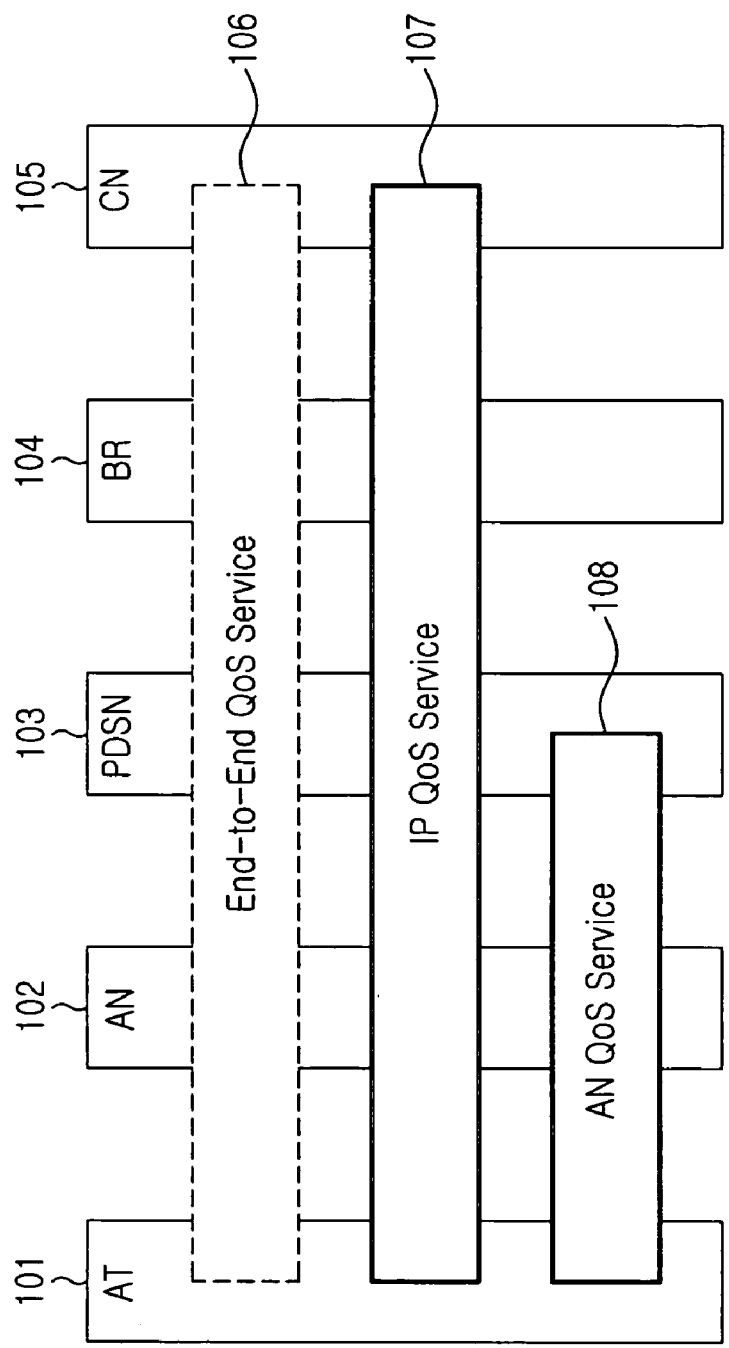
FIG. 1 is a diagram illustrating architecture for supporting End-to-End QoS via a CDMA2000 packet network whose standardization is currently in progress.
Figure 2:
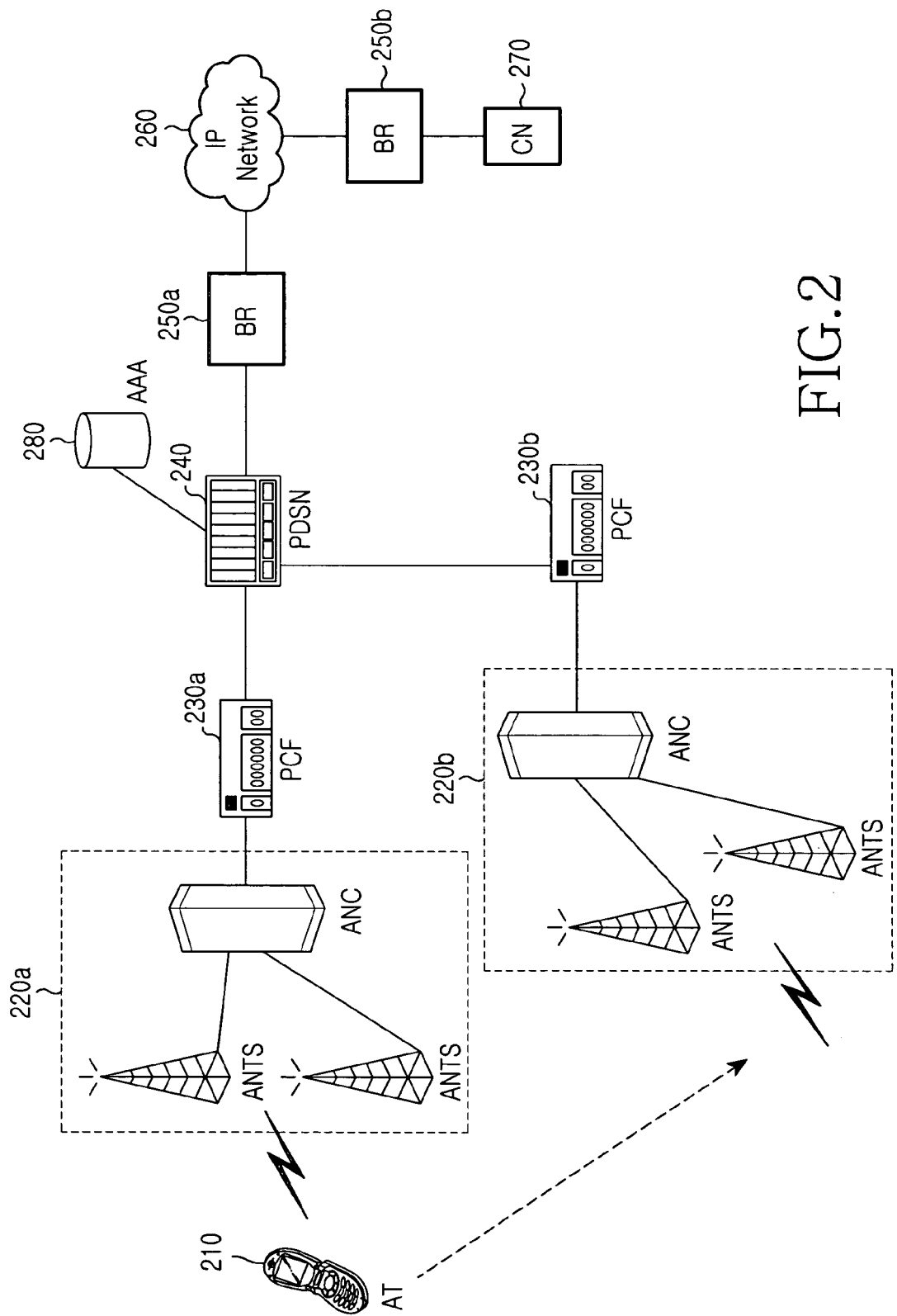
FIG. 2 is a diagram illustrating a mobile communication system to which an embodiment of the present invention is applied.

FIG. 2 is a diagram illustrating a mobile communication system for implementing an embodiment of the present invention. Referring to FIG. 2, the mobile communication system includes an access terminal (AT, or a mobile station (MS)) 210, access network controllers (ANCs, or base station controllers (BSCs)) 220a and 220b for controlling access network transceivers (ANTSs, or base transceiver subsystems (BTSs)) and an access network transceiver, both in radio communication with the access terminal 210. The mobile communication system also includes a packet data service node (PDSN) 240, packet control functions (PCFs) 230a and 230b connected between the packet data service node 240 and the access network controllers 220a and 220b for performing packet data communication, an Authentication, Authorization and Accounting (AAA) server 280 for controlling service authentication and accounting, border routers (BRs) 250a and 250b for connecting an access network 220 to an IP core network 260, and a correspondent node (CN) 270 for indicating an End-to-End (E2E) QoS Support coverage with the access terminal 210.

The access terminal 210 performs a CDMA2000 radio connection function with the access network (220a or 220b), and is connected to the packet data service node 240 through a Point-to-Point Protocol (PPP) link layer connection. The access terminal 210, located in an end for E2E QoS service, performs an E2E QoS signal processing function between ends, performs a function of mapping application QoS requirements to IP QoS parameters, and transmits the mapped QoS information to the CN 270 through RSVP. The packet data service node 240 sets up a QoS bearer in a CDMA2000 access network section based on the information. Further, the access terminal 210 supports Multiple Service Instance (MSI), and therethrough, provides a QoS function through radio traffic setup corresponding to an application characteristic.

The access network 220a, 220b provides a CDMA2000 radio connection function with the access terminal 210, and provides a packet data service with the packet data service node 240 through a Layer-2 connection (or R-P connection) function. The access network 220a, 220b sets up a bearer for QoS Support in an access network section based on QoS information received from the packet data service node 240. In the access network section, QoS provides a resource management function in an access network and radio section, a QoS admission control function, a congestion control function between internal nodes of the access network 220a, 220b, and a radio frequency (RF) scheduling function. QoS also provides a QoS function corresponding to a traffic characteristic of an application through MSI resource together with the access terminal 210.

The packet data service node 240 is connected to the access network 220a, 220b through an R-P connection, and provides a PPP connection to the access terminal 210 through the R-P connection (RAN-PDSN connection) and a packet data service therethrough. The packet data service node 240, through interworking with the AAA server 280, acquires a QoS profile for each access terminal and performs a QoS authentication function based on the QoS profile upon receiving a QoS authentication request from the access terminal 210. The packet data service node 240 supports an RSVP protocol or a Localized RSVP protocol (currently in IETF Internet Draft state) for QoS signal processing, and provides a function of receiving a QoS requirement from the access terminal 210 in IP QoS parameters and mapping the received QoS parameters to AN QoS parameters. Further, the packet data service node 240 provides an MSI setup function according to a request from the access network 220. The packet data service node 240 provides a Diff-Serv Edge function for IP QoS Service, and provides Metering, Classification, Shaping and Dropping, and Marking functions for the Diff-Serv Edge function.

The BRs 250a and 250b are routers for providing a gateway function so as to enable the CDMA2000 network including the access networks 220a and 220b and the core network to interwork with an external network (Internet or another service provider's network), and performs an IP packet routing function defined in the IETF standard. The BR 250a or 250b can perform a Re-marking function according to a Service Level Agreement (SLA) and a Traffic Conditioning Agreement (TCA) for transmission and reception of packets for QoS Service.

The CN 270 manages a network element (NE) corresponding to a counterpart node with which the access terminal desires to communicate, and can be an access terminal in the CDMA2000 network or a server in the Internet. In one embodiment of the present invention, the CN 270 is functionally identical to the access terminal 210.

Figure 3:
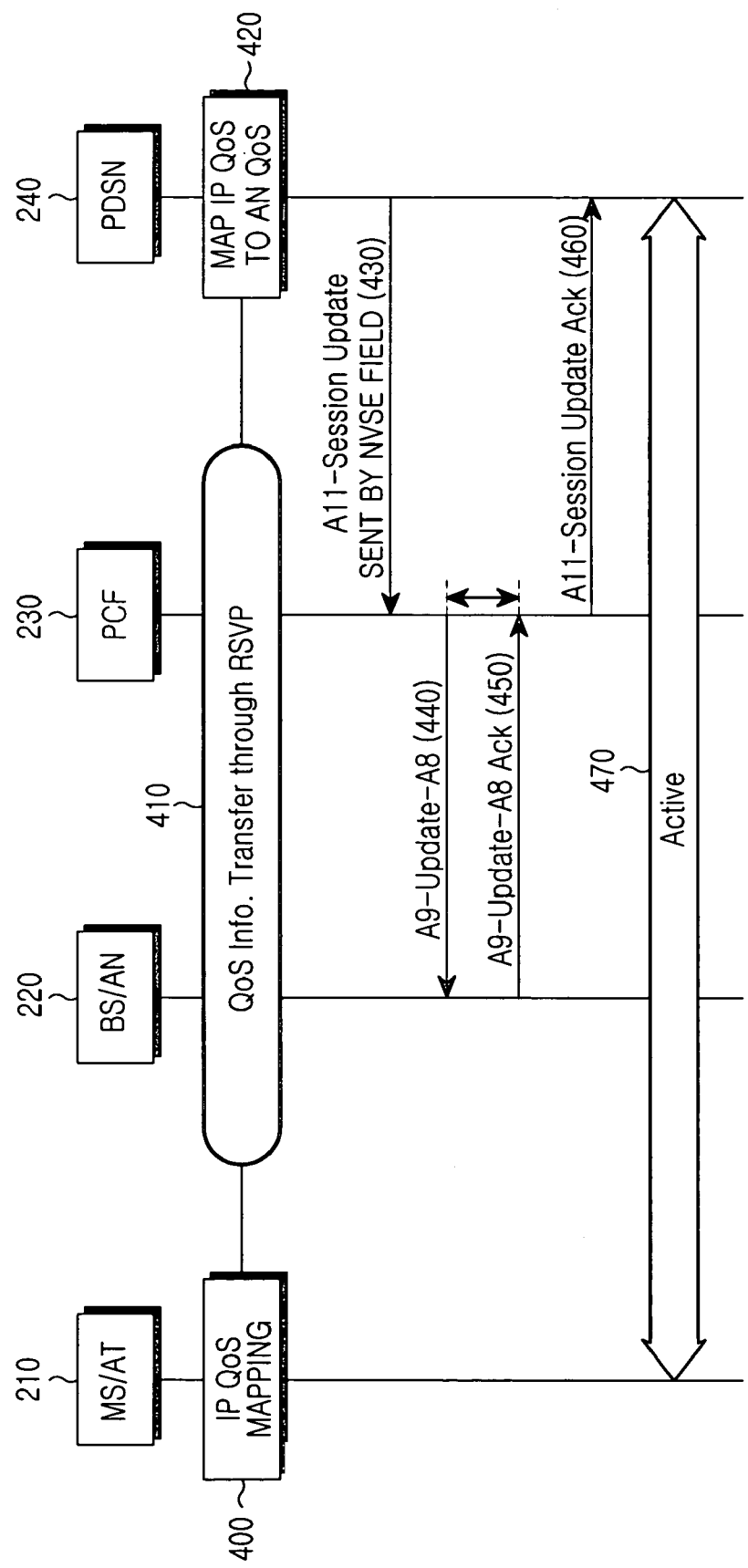
FIG. 3 is a message flow diagram illustrating a method for transmitting QoS information according to an embodiment of the present invention.

FIG. 3 is a message flow diagram illustrating a QoS Support method in the mobile communication system according to an embodiment of the present invention. Referring to FIG. 3, in step 400, an access terminal 210 maps a requirement based on an application characteristic to an IP QoS parameter. In step 410, the access terminal 210 transmits the mapped IP QoS parameter to a packet data service node 240 through an RSVP message.

In step 420, the packet data service node 240 maps the IP QoS parameter received in step 410 to an AN QoS parameter, for QoS information to be used during traffic setup in an access network 220. In step 430, the packet data service node 240 includes the AN QoS parameter in a Normal Vendor Specific Extension (NVSE) field in an A11-Session Update message, and transmits the message to a packet control function 230. Table 1 illustrates Application Type and Application Sub-Type in the NVSE field in the A11-Session Update message.

Referring to Table 1, by including QoS information in the Session Parameter which is Application Type in the NVSE field in the A11-Session Update message, QoS information set by the packet data service node 240 can be easily transferred to the access network 220.

TABLE 1

| Application Type | | Application Sub Type | | |
|---|---|---|---|---|
| Name | Value | Name | Value | Used in Message |
| Access Network Identifiers (ANID) | 04H | ANID | 01H | A11-Registration Request |
| | | All other values are reserved | | |
| PDSN Identifier | 05H | Anchor P—P Address | 01H | A11-Registration Request A11-Registration Reply |
| | | All other values are reserved | | |
| Indicators | 06H | All Dormant Indicator | 01H | A11-Registration Request |
| | | All other values are reserved | | |
| PDSN Code | 07H | PDSN CODE | 01H | A11-Registration Update |
| | | All other values are reserved | | |
| Session Parameter | 08H | RN-PDIT | 01H | A11-Registration Reply A11-Session Update |
| | | Always-On | 02H | A11-Registration Reply A11-Session Update |
| | | QoS Information | 03H | A11-Session Update A11-Session Update Ack |
| | | All other values are reserved | | |
| Service Option | 09H | Service Option Value | 01H | A11-Registration Request |
| | | All other values are reserved | | |
| All other values are reserved | | | | |

The detailed fields of the QoS information in Table 1 are illustrated in Table 2.

TABLE 2

| Application Sub Type | | 10 |
|---|---|---|
| Direction | Traffic Class | 11 |
| | Bandwidth | 12 |
| Direction | Traffic Class | 13 |
| | Bandwidth | 14 |

Referring to Table 2, traffic class information can be written, and in an embodiment of the present invention, a service class is classified into the following four service classes.

The service class is classified into a Conversational class, a Streaming class, an Interactive class, and a Background class. The respective service classes have their own requirements for a packet loss, a delay, and a bandwidth. A method for mapping an IP QoS parameter to an Access Network QoS parameter of the packet control function 230 in step 420 will be described in detail herein below.

In step 440, the packet control function 230 receiving the QoS information transmits the QoS information to the access network 220 through an A9-Update-A8 message. An example of the A9-Update-A8 message is illustrated in Table 3.

TABLE 3

| Information Element | Element Direction | | Type |
|---|---|---|---|
| A9 Message Type | BS <-> PCF | | M |
| Call Connection Reference | BS <-> PCF | O | R |
| Correlation ID | BS <-> PCF | $O^a$ | C |
| Mobile Identity (IMSI) | BS <-> PCF | O | R |
| Mobile Identity (ESN) | BS <-> PCF | $O^{b,c}$ | C |
| IS-2000 Service Configuration Record | BS <-> PCF | $O^c$ | C |
| Service Option | BS <-> PCF | $O^c$ | C |
| User Zone ID | BS -> PCF | $O^c$ | C |
| Quality of Service Parameters | BS <-> PCF | $O^c$ | C |
| Cause | BS <-> PCF | O | R |
| RC-PDSDT | PCF -> BS | $O^d$ | C |
| SR_ID | BS -> PCF | $O^{c,e}$ | R |
| Quality of Service Information | BS <- PCF | O | C |

Referring to Table 3, QoS information set by the packet data service node 240, including QoS information in the A9-Update-A8 message, is transmitted to the access network 220.

In step 450, the access network 220 receiving the A9-Update-A8 message transmits an A9-Update-A8 Ack message to the packet control function 230 to acknowledge successful receipt of the QoS information.

In step 460, the packet control function 230 transmits an A11-Session Update Ack message to the packet data service node 240 to inform the packet data service node 240 of successful transmission of the QoS information.

In step 470, the access terminal 210 receives data from the packet data service node 240 based on the QoS information transmitted in step 400.

A detailed description will now be made of a method for mapping IP QoS information to a QoS parameter for QoS setup of the access network, performed in step 420, and a method for defining the QoS parameter transmitted through the mapping.

An Access Network QoS parameter for transferring an IP QoS parameter acquired through IP QoS to an access network through mapping is classified into an AN Traffic Class parameter and a Bandwidth parameter.

In 3GPP2, all traffics are classified into four traffic classes according to their characteristic as shown in Table 4. The traffic classes are fundamentally classified according to Delay, Delay Variation, and Information Loss in terms of application.

TABLE 4

| Classification | | Conversational Class | Streaming Class | Interactive Class | Background Class |
|---|---|---|---|---|---|
| Traffic Characteristic | | Interactive, Real-time service | Non-interactive, real-time service | Interactive, non-realtime service | Non-interactive, non-realtime service |
| Error Tolerant Service | E2E Delay | <150 ms (max 400 ms) | <10 sec (Start-up Delay) | <1 sec or <2 sec | N/A |
| | Delay Variation | <1 ms | <2 sec | <1 ms | N/A |
| | Information Loss | <1% FER or <3% FER | <1% or <2% packet loss rate | <3% FER | N/A |
| | Application | VoIP, Video telephony | Streaming audio and video | Voice messaging | Fax |
| Error Intolerant Service | E2E Delay | <250 ms | <10 sec (Start-up Delay) | <4 sec | N/A |
| | Delay Variation | N/A | N/A | N/A | N/A |
| | Information Loss | Zero | Zero | Zero | N/A |
| | Application | Telnet, Interactive games | FTP, Still image, paging | Web browsing, E-commerce | E-mail arrival notification |

Because the access network 220 needs to subdivide the traffic classes, an embodiment of the present invention classifies a traffic class for the access network 220 into 7 traffic classes illustrated in Table 5. A first criterion for the classification shown in Table 5 considers a characteristic of a radio section, and each traffic class is subdivided into two traffic classes according to whether Radio Link Protocol (RLP) is necessary in a radio link for which a characteristic of information loss is considered. Here, Background class, which is not for QoS traffic, is not separately divided. A second criterion classifies priority in terms of a transmission delay, which is most keenly required for QoS. The priority is determined in order of Transmission Delay and Delay Variation.

TABLE 5

| AN | | QoS Attribute | | | | |
|---|---|---|---|---|---|---|
| Traffic Class | General Traffic Class | Relative Priority | Delay | Delay Variation | Information Loss | Main Service |
| A1 | Conversational | Priority 1 | <150 ms | <1 ms | <1~3% FER | VoIP, Video Telephony |
| A2 | Class | Priority 2 | <250 ms | N/A | Zero | Interactive Game |
| B1 | Streaming | Priority 3 | — | <2 sec | <1~2% PLR | Streaming service |
| B2 | Class | Priority 4 | — | N/A | Zero | FTP, Still Image |
| C1 | Interactive | Priority 5 | <1~2 sec | <1 ms | <3% FER | Voice messaging |
| C2 | Class | Priority 6 | <4 sec | N/A | Zero | Web-browsing, E-Commerce |
| D | Background Class | Priority 7 | N/A | N/A | N/A | E-mail notification |

Referring to Table 5, information on Transmission Delay, Delay Variation, Information Loss, and Priority among five parameters generally required for QoS is included. That is, all packet services are mapped to the seven traffic classes defined in Table 5 in order to support QoS in the access network 220.

As another parameter, a Bandwidth parameter is defined, and because this has various requirements, Bandwidth information of the IP QoS parameter is used as it is.

Figure 4:
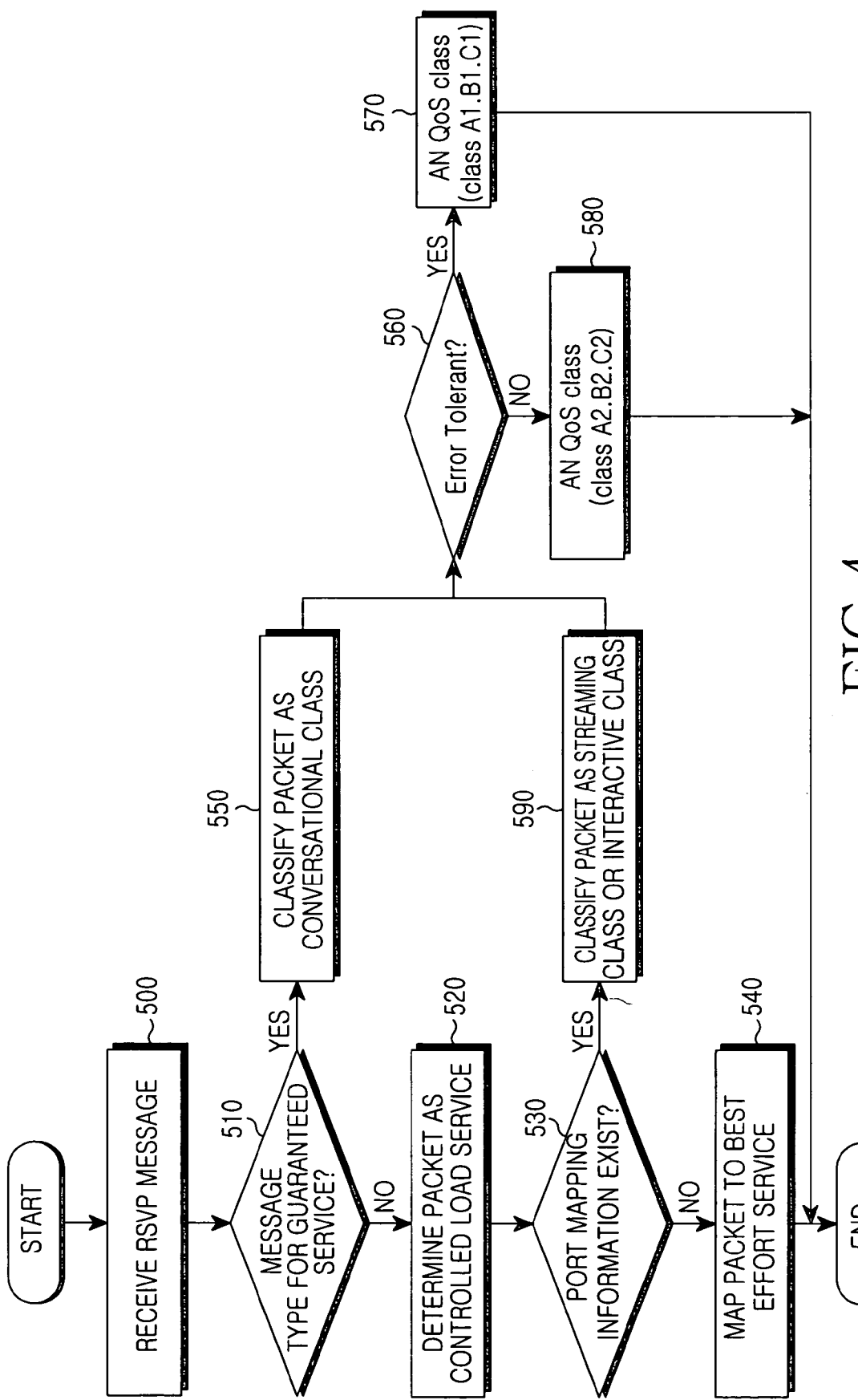
FIG. 4 is a flowchart illustrating a method for mapping QoS information in a packet data service node according to an embodiment of the present invention.

FIG. 4 is a flowchart illustrating a detailed operation for mapping an IP QoS parameter to an AN QoS parameter, performed in step 420 by the packet data service node 240.

Referring to FIG. 4, in step 500, the packet data service node 240 receives an RSVP Resv message from an access terminal 200. In step 510, the packet data service node 240 determines whether a Flowspec Message Type field in the received RSVP Resv message indicates a message type for Guaranteed Service defined in RFC2212. If it is determined in step 510 that the Flowspec Message Type field does not indicate a message type for Guaranteed Service, the packet data service node 240 determines the packet as Controlled Load Service in step 520. Thereafter, the packet data service node 240 determines in step 530 whether there is any port mapping information in a port mapping table managed therein in determining AN Traffic Class. An example of the port mapping table is illustrated in Table 6.

TABLE 6

| AN Traffic Class | Mapping Port |
|---|---|
| AN Traffic Class (A1) | 5004, 5005, . . . |
| AN Traffic Class (A2) | 5004, 5005, 23, . . . |
| AN Traffic Class (B1) | 5004, 554, . . . |
| AN Traffic Class (B2) | 20, 21, . . . |
| AN Traffic Class (C1) | . . . |
| AN Traffic Class (C2) | 80, . . . |
| AN Traffic Class (D) | N/A |

If it is determined in step 530 that there is no corresponding port, the packet data service node 240 maps the packet to Background Class (or Best Effort Service) of Table 5 in step 540.

However, if it is determined in step 510 that the Flowspec Message Type field indicates a message type for Guaranteed Service, the packet data service node 240 classifies the packet as Conversational Class illustrated in Table 5 in step 550. In addition, if it is determined in step 530 that there is corresponding port mapping information in the port mapping table, the packet data service node 240 maps the packet to one of AN Traffic Classes corresponding to Streaming Class and Interactive Class of Table 5 in step 590. If the packet data service node 240 fails to map the packet to one of the AN Traffic Classes in steps 550 and 590, it determines in step 560 whether an error is tolerable, and then determines final AN Traffic Class according to the determination result in step 570 or 580. That is, as illustrated in Table 5, in step 570, final AN Traffic Class is determined as A1, B1 and C1, and in step 580, final AN Traffic Class is determined as A2, B2 and C2.

Bandwidth for AN QoS setup is a separately defined AN QoS parameter. In case of Guaranteed Service, the AN QoS parameter is transmitted using Rspec information in Flowspec, and in case of Controlled Load Service, the AN QoS parameter is transmitted using Token Bucket Rate in Tspec in Flowspec.

As described above, in a CDMA2000 1×EV-DO high-rate packet data system, information for distinguishing multiple services and QoS information suitable for each service are transmitted from a packet data service node to an access network, thereby increasing efficiency in terms of resource allocation in the access network and smoothly managing traffic setup.

In addition, when an End-to-End QoS function is applied to a CDMA2000 packet network, QoS information in an IP layer can be efficiently mapped to QoS information required in a CDMA2000 access network, thereby securing quality of new real-time services such as packet-based Video Telephone Service and packet-based Packet Voice Service.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A Quality-of-Service (QoS) Support method in a mobile communication system including an access terminal, an access network for performing packet data communication with the access terminal, a packet control function for controlling transmission and reception of packet data between the access network and the access terminal, and a packet data service node for exchanging packet data with the packet control function, the method comprising the steps of:

(a) mapping, by the access terminal, a requirement based on an application characteristic to an Internet Protocol (IP) QoS parameter, generating a resource reservation protocol (RSVP) message, and transmitting the resource reservation protocol message to the packet data service node;

(b) mapping, by the packet data service node, IP QoS information to be transmitted to the access terminal to QoS information needed in the access network, and transmitting the mapping result to the access network via the packet control function; and (c) receiving, by the access terminal, data including QoS information from the packet data service node, and performing communication according to the QoS information;

wherein the step (b) comprises the steps of:

(b1) determining whether a type of a message received by the packet data service node is defined as a type for Guaranteed Service; and (b2) classifying a received packet as Conversational Class if the type of the received message is defined as a type for Guaranteed Service.

2. The QoS Support method claim 1, further comprising the step of (b3) determining, by the packet data service node, the received packet as Control Load Service if the type of the received message is not defined as a type for Guaranteed Service, and determining Access Network Traffic Class depending on a port mapping table.

3. The QoS Support method of claim 2, wherein the step (b3) comprises the steps of:

(b3-1) determining whether there is port information mapped to the port mapping table; and (b3-2) mapping the received packet to Best Effort Service if there is no port information mapped to the port mapping table.

4. The QoS Support method of claim 2, wherein the step (b3) comprises the steps of:

(b3-3) determining whether there is port information mapped to the port mapping table; and (b3-4) mapping the received packet to Streaming Class or Interactive Class if there is port information mapped to the port mapping table.

5. The QoS Support method of claim 1, wherein the step (b2) comprises the step of determining by the packet data service node whether an error is tolerable if Access Network Traffic Class is not defined, and determining final Access Network Traffic Class according to the determination result.

6. The QoS Support method of claim 4, wherein the step (b3-4) comprises the step of determining by the packet data service node whether an error is tolerable if Access Network Traffic Class is not defined, and determining final Access Network Traffic Class according to the determination result.

7. A Quality-of-Service (QoS) Support method in a packet data service node in a mobile communication system including an access terminal, an access network for performing packet data communication with the access terminal, a packet control function for controlling transmission and reception of packet data between the access network and the access terminal, and the packet data service node for exchanging packet data with the packet control function, the method comprising the steps of:

(a) mapping a requirement based on an application characteristic from the access terminal to an Internet Protocol (IP) QoS parameter, and receiving a resource reservation protocol (RSVP) message; and (b) mapping IP QoS information to be transmitted to the access terminal to QoS information needed in the access network, and transmitting data including QoS information to the access terminal via the packet control function;

wherein the step (b) comprises the steps of:

(1) determining whether a type of a message received by the packet data service node is defined as a type for Guaranteed Service; and (b2) classifying a received packet as Conversational Class if the type of a received message is defined as a type for Guaranteed Service.

8. The QoS Support method of claim 7, further comprising the step of (b3) determining, by the packet data service node, the received packet as Control Load Service if the type of a received message is not defined as a type for Guaranteed Service, and determining Access Network Traffic Class depending on a port mapping table.

9. The QoS Support method of claim 8, wherein the step (b3) comprises the steps of:

(b3-1) determining whether there is port information mapped to the port mapping table; and (b3-2) mapping the received packet to Best Effort Service if there is no port information mapped to the port mapping table.

10. The QoS Support method of claim 8, wherein the step (b3) comprises the steps of:

(b3-3) determining whether there is port information mapped to the port mapping table; and (b3-4) mapping the received packet to Streaming Class or Interactive Class if there is port information mapped to the port mapping table.

11. The QoS Support method of claim 7, wherein the step (b2) comprises the step of determining whether an error is tolerable if Access Network Traffic Class is not defined, and determining final Access Network Traffic Class according to the determination result.

12. The QoS Support method of claim 10, wherein the step (b3-4) comprises the step of determining whether an error is tolerable if Access Network Traffic Class is not defined, and determining final Access Network Traffic Class according to the determination result.

* * * * *